(12) United States Patent
Goglio

(10) Patent No.: US 8,562,215 B2
(45) Date of Patent: Oct. 22, 2013

(54) PACKAGE FOR GRANULAR PRODUCTS

(75) Inventor: Franco Goglio, Milan (IT)

(73) Assignee: Goglio S.p.A., Milan (IT)

( * ) Notice: Subject to any disclaimer, the term of this patent is extended or adjusted under 35 U.S.C. 154(b) by 405 days.

(21) Appl. No.: 12/702,677

(22) Filed: Feb. 9, 2010

(65) Prior Publication Data

US 2010/0200454 A1     Aug. 12, 2010

(30) Foreign Application Priority Data

Feb. 9, 2009     (IT) .............................. MI2009A0166

(51) Int. Cl.
  *B65D 30/08*     (2006.01)
  *B65D 30/00*     (2006.01)
  *B65D 81/20*     (2006.01)

(52) U.S. Cl.
  USPC .......................... 383/109; 383/107; 206/524.8

(58) Field of Classification Search
  USPC ..................... 383/109, 116, 110, 113, 114, 3,
      383/124–126; 229/87.02, 87.05; 206/524.8
  See application file for complete search history.

(56) References Cited

U.S. PATENT DOCUMENTS

| | | | | |
|---|---|---|---|---|
| 1,933,776 A | * | 11/1933 | Tooker | 383/98 |
| 2,330,015 A | * | 9/1943 | Stokes | 383/109 |
| 2,353,402 A | * | 7/1944 | Haslacher | 493/192 |
| 2,785,720 A | * | 3/1957 | Wikle | 383/119 |
| 3,220,601 A | * | 11/1965 | Kasting | 383/54 |
| 4,285,998 A | * | 8/1981 | Thibodeau | 383/119 |
| 4,636,412 A | * | 1/1987 | Field | 604/408 |
| 4,734,292 A | * | 3/1988 | Gerardus Van Boxtel | 426/410 |
| 5,501,525 A | | 3/1996 | Cox et al. | |
| 6,396,036 B1 | | 5/2002 | Hanson | |

FOREIGN PATENT DOCUMENTS

| | | | |
|---|---|---|---|
| DE | 101 10 130 A1 | 9/2002 | |
| EP | 0 278 130 A | 8/1988 | |
| EP | 0 278 130 A1 | 8/1988 | |
| EP | 0 361 711 A | 4/1990 | |
| EP | 549500 A1 * | 6/1993 | ............. B65D 30/14 |
| JP | 04310731 A * | 11/1992 | ................ B32B 7/12 |
| JP | 11124170 A * | 5/1999 | ............. B65D 75/20 |

OTHER PUBLICATIONS

Machine translation of EP 549500 A1. Translated on Aug. 27, 2012.*
European Search Report in Corresponding Application IO 1826/IT MI20090166 Dated Sep. 3, 2009.

* cited by examiner

*Primary Examiner* — Jes F Pascua
(74) *Attorney, Agent, or Firm* — Young & Thompson

(57) ABSTRACT

There is described a package (10) of laminated multilayer material (PM) with at least two layers (17, 18) coupled to each other, for granular products, the package (10) consisting of a parallelepiped container including, in the position of use, a bottom wall (11), a top wall (12), a rear wall (14) and two side walls (15). The at least two layers (17, 18) of multilayer laminated material (PM) have areas of non-total coupling at the front (13), rear (14) and side (15) walls.

20 Claims, 7 Drawing Sheets

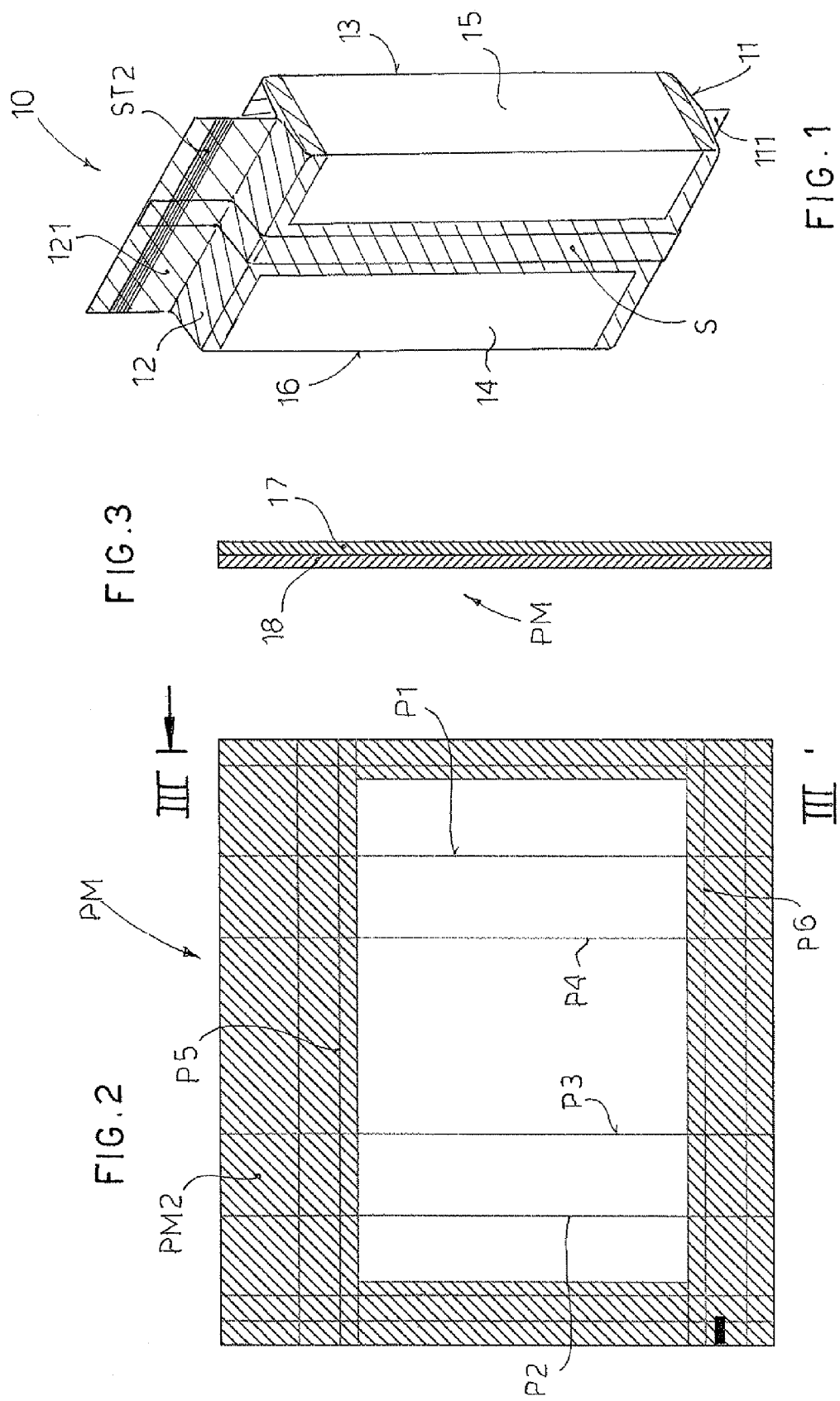

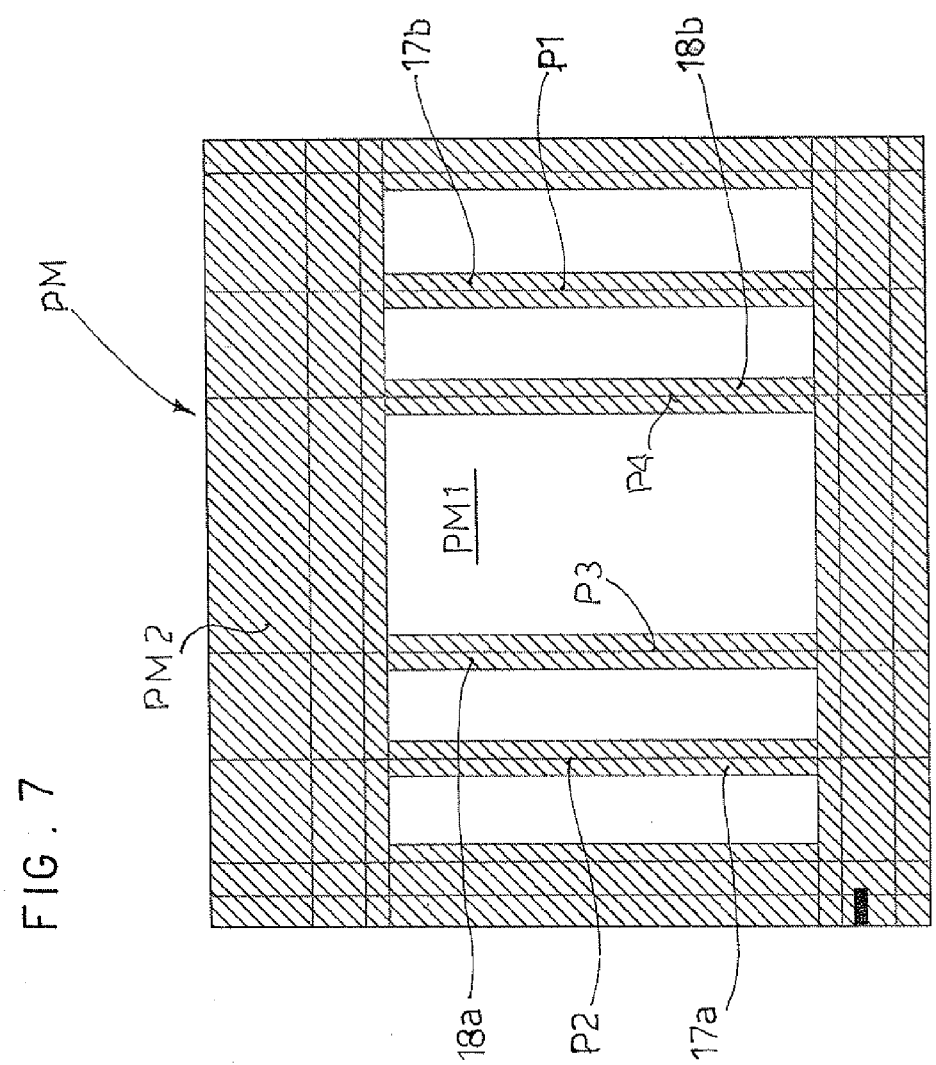
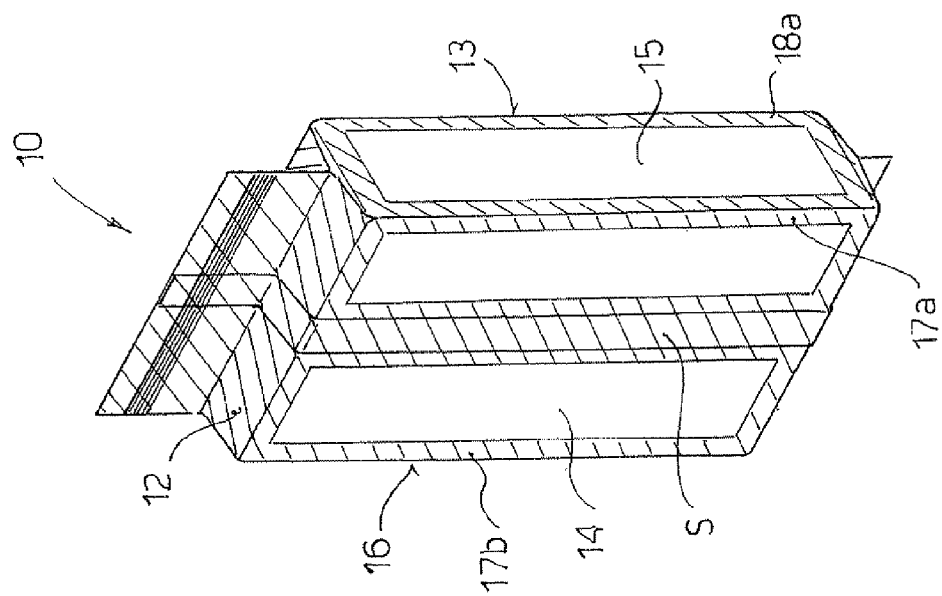
FIG. 7
FIG. 6

PACKAGE FOR GRANULAR PRODUCTS

TECHNICAL FIELD

The present invention refers to a package for granular products. In particular, the present invention refers to a vacuum package for food products in granules, such as rice and cereals in general, for example.

PRIOR ART

As is known, food products in granules, which the invention particularly refers to, are vacuum packaged in containers made of laminate material or multilayer film, which typically comprises two or more layers of suitable material permanently coupled or linked on the entire surface, for example by gluing.

Typically, the film comprises an inner sealing layer, made of polyethylene, low density polyethylene (LDPE), polypropylene and the like, coupled with an outer layer made of nylon (bi-oriented or otherwise) and the like. The inner layer of the film is destined during use to come into contact with the product in granules that is to be packaged.

EP 278,130 describes a container, particularly for granular products, with a double wall, comprising, that is, an inner wall in contact with the product and an outer wall fixed to the inner wall by means of adhesive areas, which leave channels for the entry of ambient air into the space between the two walls. In this manner, when vacuum is created in the container, the inner wall adheres to the granular product following the irregularities thereof, whereas the outer wall remains smooth due to the entry of air into the above mentioned space.

SUMMARY OF THE INVENTION

The Applicant has noted that the above described vacuum packages for granular products of the prior art present the drawback of being subject to punctures.

As stated previously, a vacuum is created inside the package, so that the granular product is in very close contact with the walls of the package, in particular with the front, rear and side walls. In the case of the granular product presenting roughness or sharp areas, as for example in the case of grains of rice, these can cause puncturing of the package, with a consequent loss of vacuum and possible escape and/or deterioration of said product.

Therefore, the Applicant has tackled the problem of providing a package for granular products that is able to overcome the above mentioned drawback.

In particular, the Applicant has tackled the problem of providing a package for granular products that has a high resistance to puncture by the granular product contained therein.

This object is achieved by the package according to the invention, which has the characteristics of appended independent claim 1.

Advantageous embodiments of the invention are described in the dependent claims.

Essentially, the package according to the invention, made from a multilayer film, comprising at least an inner sealing layer of material with a certain elasticity, such as polyethylene, and at least an outer layer of material with greater stiffness, such as nylon, is characterised in that said layers are not completely coupled to each other in the area destined to be disposed at the front, rear and side walls of the package, said layers in any case being perimetrally coupled to each other so as to prevent the entry of air therebetween. In this manner two fundamental aspects come to co-exist: stiffness of the laminate to ensure machinability and elasticity to increase the resistance thereof to puncture.

Advantageously, in this area no coupling or a punctiform coupling between said layers is provided. Total coupling can optionally be provided along strips in the package placed at least at a pair of vertical corners thereof.

The non-total coupling between the two layers in the above mentioned area allows the inner layer to be elastically deformed so as to adapt to any sharp parts of the granular product when the package is placed under vacuum, whereas the outer layer gives the package stiffness. In this manner the risk of puncture with a consequent loss of vacuum, present in the packages of the prior art made of multilayer material coupled over the entire surface, is avoided.

BRIEF DESCRIPTION OF THE DRAWINGS

The present invention will made clearer by the following detailed description of purely exemplifying, and therefore non limiting embodiments thereof, to be read with reference to the appended drawings, wherein:

FIG. 1 is an axonometric view of a package for granular products according to a first embodiment of the invention, in the position of use;

FIG. 2 is a development view of the package of FIG. 1;

FIG. 3 is a sectional view, greatly enlarged in thickness, taken along the line III-III of FIG. 2;

FIG. 6 is an axonometric view of a package for granular products according to a third embodiment of the invention;

FIG. 7 is a development view of the package of FIG. 6;

DETAILED DESCRIPTION OF PREFERRED EMBODIMENTS OF THE INVENTION

Figure 16:
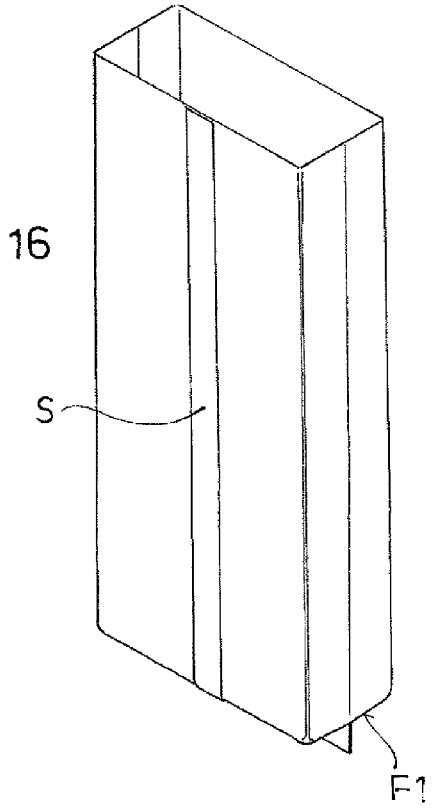
Figure 15:
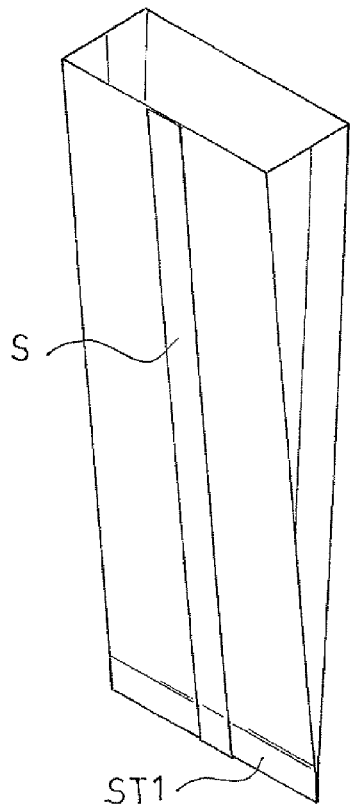
Figure 17:
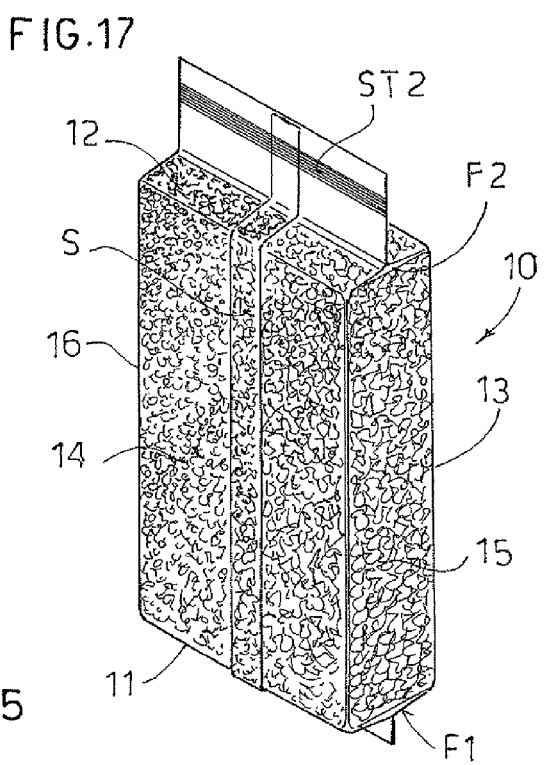

Referring initially to FIGS. 14 to 17, a method, to be considered per se known, for producing a package of the type in the invention is briefly described. This package has been designated as a whole with reference numeral 10 in FIG. 17, is essentially parallelepiped in shape and has a bottom wall or base 11, a top wall 12, a front wall 13, a rear wall 14 and two side walls 15 and 16.

Figure 14:
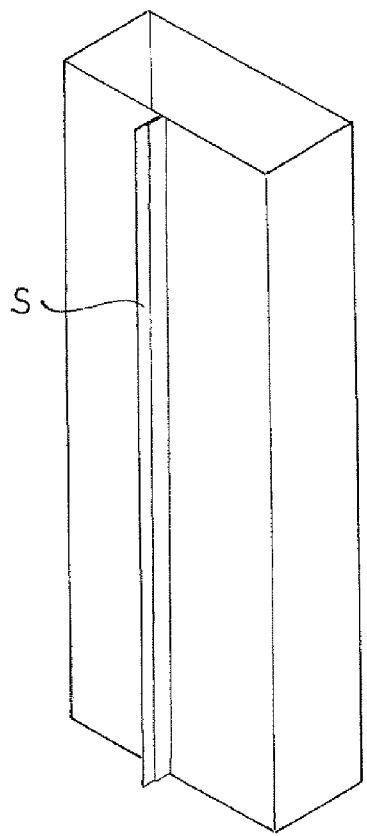
FIGS. 14-17 show diagrammatically the successive stages in formation of a package for granular products according to the invention.

This package is made starting from a band of multilayer sheet material, the inner side of which is heat-sealing, which is made to travel along a mandrel, normally disposed vertically, and around which it is closed by means of a longitudinal seal S so as to form a tube which in FIG. 14 is shown diagrammatically already cut to the right length to form the package 10.

There is subsequently made a bottom transverse seal ST1 (FIG. 15) which closes the tube at the bottom, followed by a bellows F1 (FIG. 16). The tube closed at the bottom, in the form of a bag, as shown in FIG. 16, is filled with a pre-set amount of granular product and subsequently closed at the top by means of a further transverse seal ST2 and subsequent bellows F2 (FIG. 17) to close the package. Before closure of the package, a vacuum is created inside the bag, thus obtaining a vacuum pack of granular product.

Referring now to FIGS. 1 to 13, the characteristics of the invention, in the various embodiments, will now be illustrated, using for convenience the same reference numerals already introduced with reference to FIGS. 14 to 17.

Reference is made initially to the embodiment of FIGS. 1 to 3, in which FIGS. 2 and 3 show respectively a development view and a sectional view of a multilayer film PM used to make the package 10 shown in FIG. 1.

The film PM may comprise a plurality of layers coupled to each other. FIG. 3 shows a film formed of only two layers, namely an outer layer 17 and an inner layer 18. What is meant by inner layer is the layer of multilayer film PM suitable to come into contact, in use, with the packaged granular product.

The outer layer 17 is preferably made of substantially stiff polymeric material, for example nylon (bi-oriented or otherwise) and the like, whereas the inner layer 18 is made of substantially elastic polymeric material, of the sealing type, for example linear polyethylene (LLDPE), low density polyethylene (LDPE), cast polypropylene and the like.

The two layers of material 17, 18 of the multilayer film PM are coupled or linked to each other by gluing, using suitable adhesives, such as polyurethane based adhesives, polyester based adhesives, so-called solventless adhesives and the like.

According to the invention, coupling between the layers 17, 18 is not total over their entire surface, but such as to leave uncoupled areas, which will be described in detail below.

In particular, in all the appended figures, the hatched and dotted areas indicate areas of coupling between the layers of material, whereas the white areas indicate areas in which there is no coupling between said layers.

In particular, with reference to FIG. 2, the multilayer film PM has a central area PM1 of non coupling and an edge area PM2 of coupling. The central area PM1 is destined to form the front 13, rear 14 and side walls 15 and 16, that is, essentially the whole side surface of the package 10 with the exception of the area affected by the longitudinal seal S and limited areas at the bottom and top horizontal corners of the package, whereas the edge area PM2 is destined to form the base 11 and the top wall 12 of the package, with the relative folded protruding edges 111 and 121, besides the above mentioned longitudinal seal S.

In the development view of FIG. 2 the unbroken vertical P1-P4 and horizontal P5, P6 lines indicate the fold lines destined to form the vertical and horizontal corners, respectively, of the package 10.

The absence of coupling or linking between the outer layer 17 and the inner layer 18 in the central area PM1 of the multilayer film PM advantageously allows a package 10 to be obtained whose front 13, rear 14 and side walls 15 and 16 are at the same time stiff, and therefore strong, on the outside, through the effect of the nylon or similar materials, and substantially elastic and deformable on the inside, through the effect of the polyethylene or the like.

In fact, since the inner layer 18 is detached from the nylon layer, it is advantageously able to deform elastically so as to adapt to any sharp parts present in the granular product that will fill the vacuum package, with a resulting absence of punctures thereof and no escape or deterioration of the granular product.

Furthermore, the presence of the coupling area PM2 allows a package 10 provided with a stiff base 11 and top wall 12 to be obtained, with obvious advantages in terms of stability of the package in the position of use and strength thereof.

Figure 5:
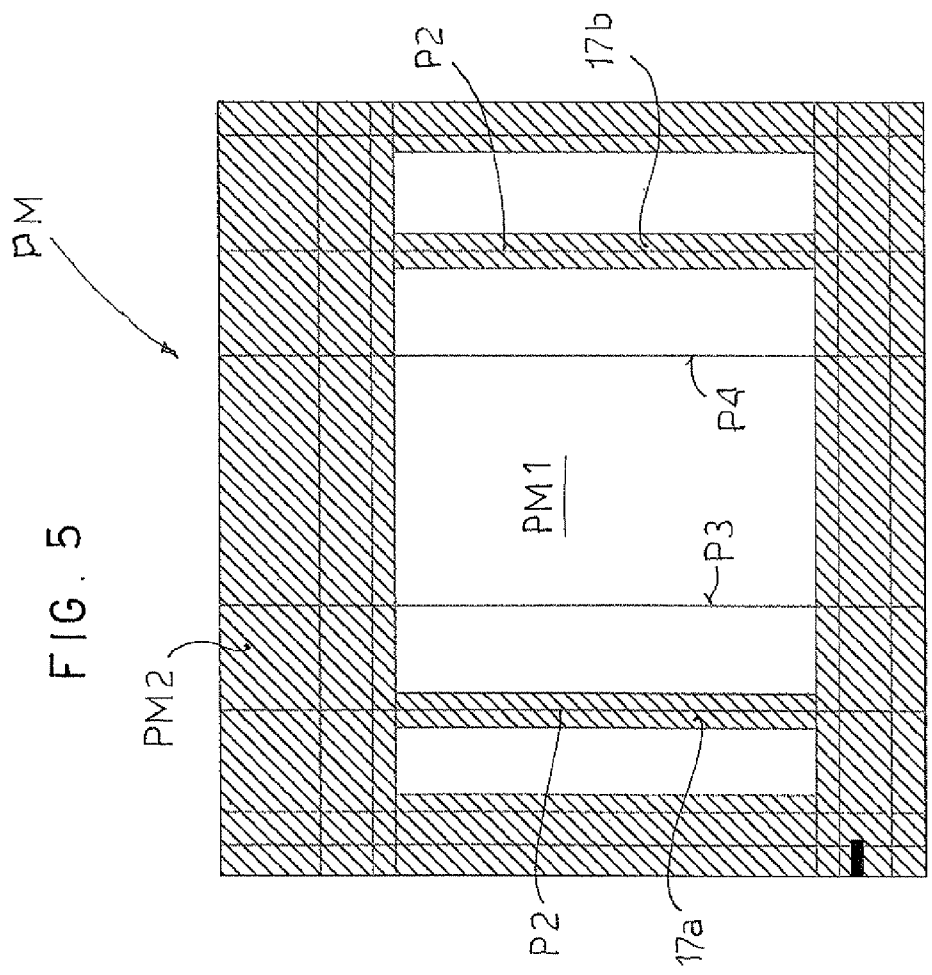
FIG. 5 is a plan view of the package of FIG. 4.
Figure 4:
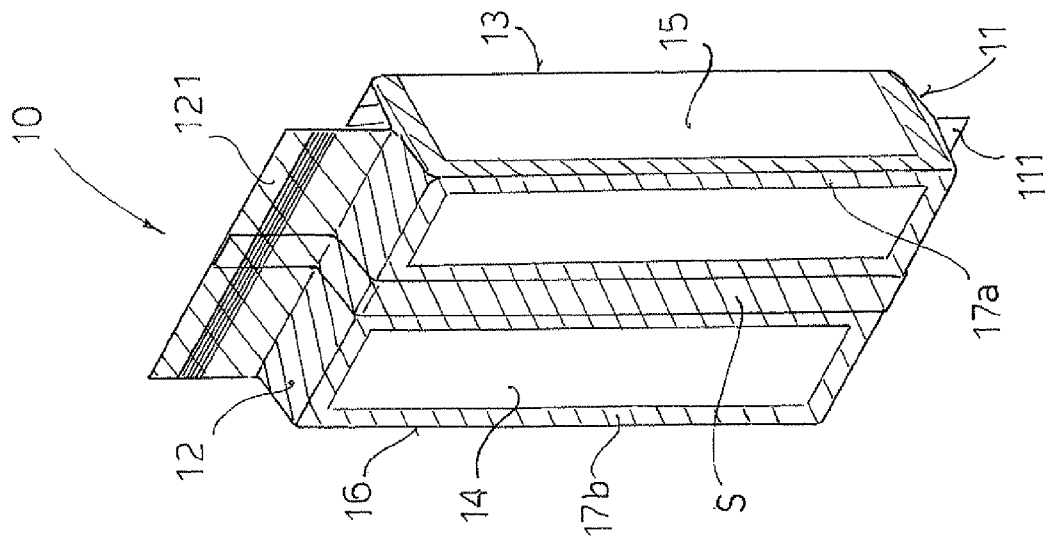
FIG. 4 is an axonometric view of a package for granular products according to a second embodiment of the invention.
Figure 8:
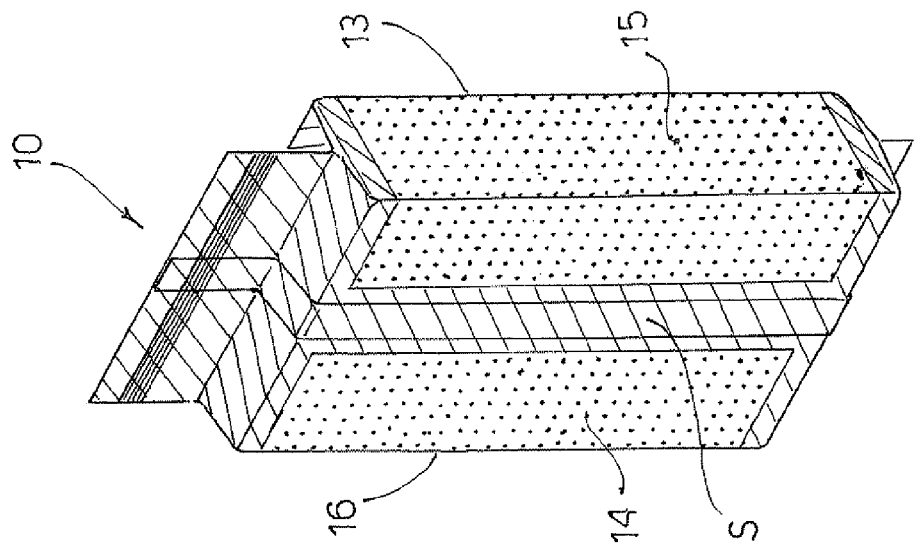
FIG. 8 is an axonometric view of a package for granular products according to a fourth embodiment of the invention.
Figure 9:
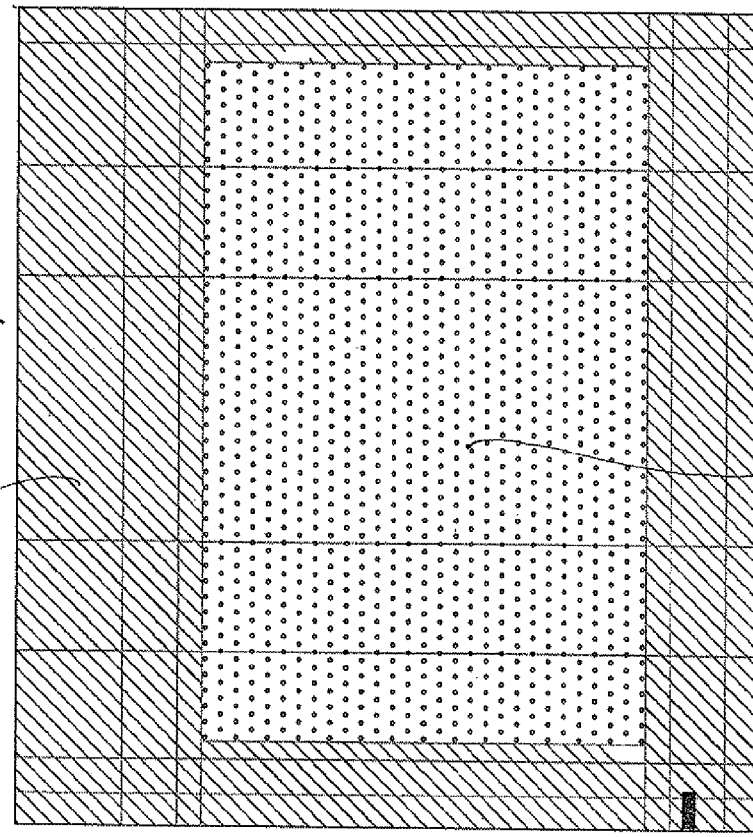
FIG. 9 is a development view of the package of FIG. 8.
Figure 10:
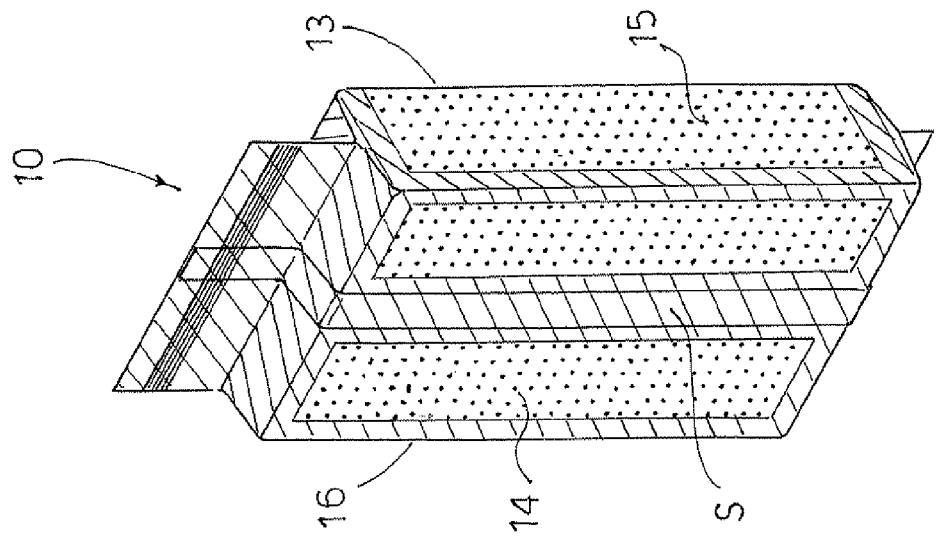
FIG. 10 is an axonometric view of a package for granular products according to a fifth embodiment of the invention.
Figure 11:
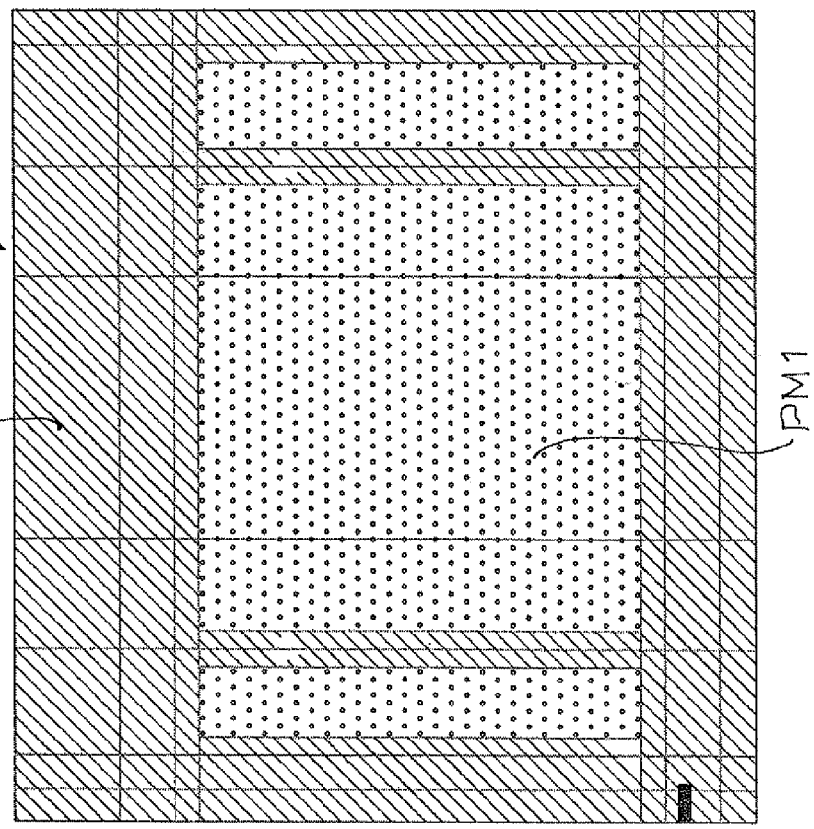
FIG. 11 is a development view of the package of FIG. 10.
Figure 12:
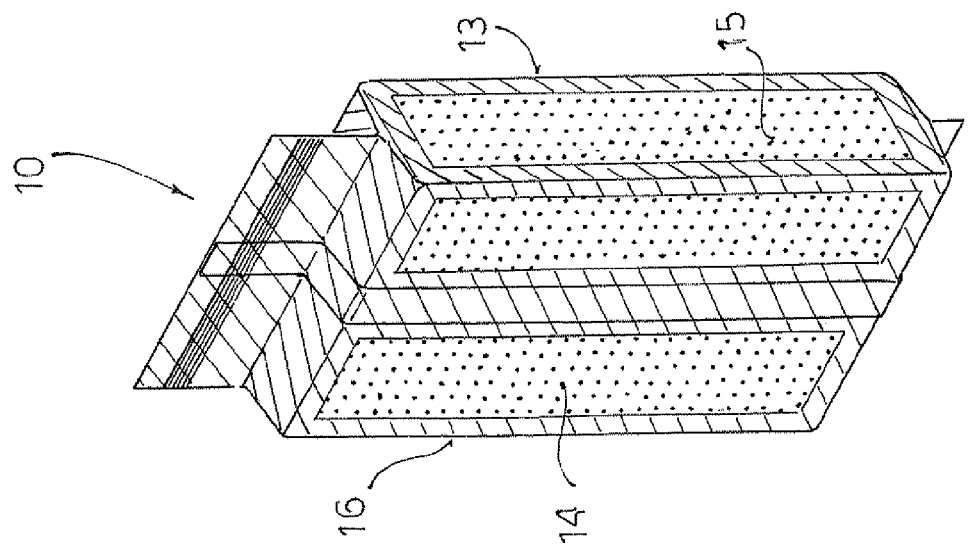
FIG. 12 is an axonometric view of a package for granular products according to a sixth embodiment of the invention.
Figure 13:
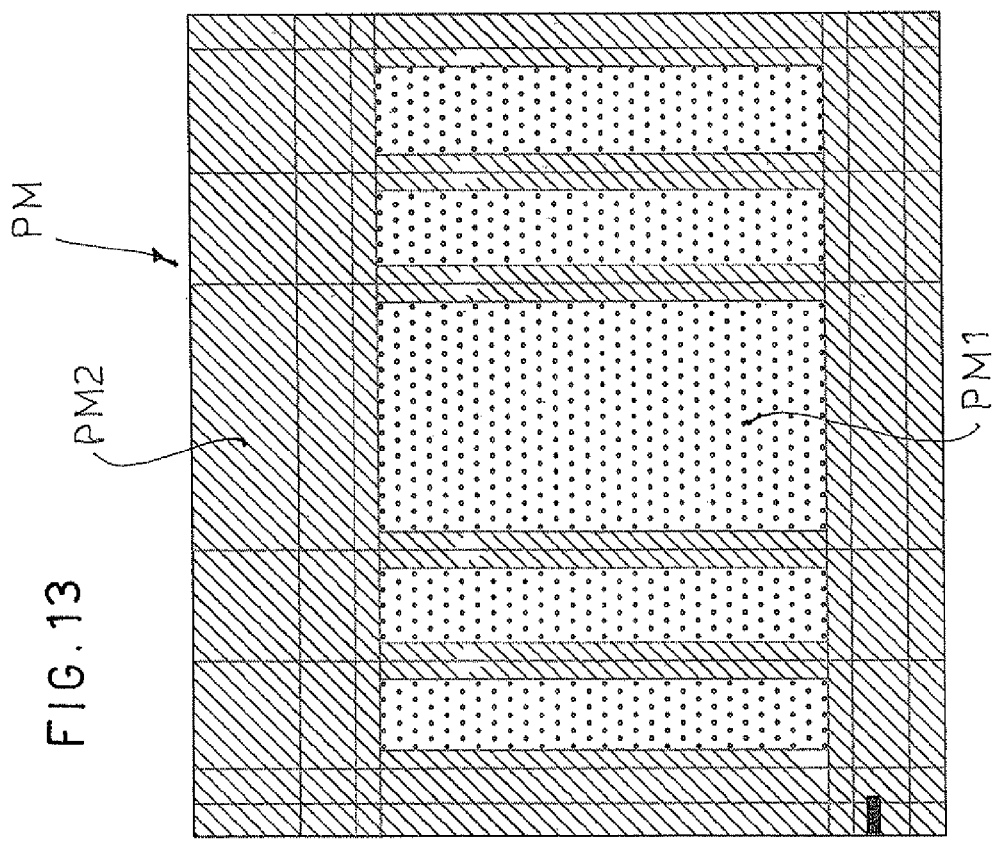
FIG. 13 is a development view of the package of FIG. 12.

FIGS. 4 and 5 show a second embodiment of a package for granular products according to the invention, designated again with reference numeral 10.

Said package differs from the package of FIGS. 1 and 2 in that it has a pair of areas of coupling 17a and 17b formed, respectively, along the above mentioned vertical fold lines P1 and P2 of the multilayer film PM, destined to form the vertical corners of the package between the side walls 15 and 16 thereof and the rear wall 14.

Such a configuration makes it possible to combine with the advantages listed above with reference to the package of FIG. 1 a further stiffening of the package of granular products.

FIGS. 6 and 7 illustrate a third embodiment of the packaging for granular products according to the invention, which differs from those of FIGS. 4 and 5 in that it has, in addition to the pairs of areas of coupling 17a and 17b, formed along the fold lines P1 and P2, a further pair of areas of coupling 18a and 18b, formed along the vertical fold lines P3 and P4 of the multilayer film PM, destined to form the vertical corners between the side walls 15 and 16 and the front wall 13 of the package.

Such a configuration makes it possible to combine with the advantages listed with reference to the packages of the first and second embodiment a further stiffening of the package of granular products.

FIGS. 8-9, 10-11 and 12-13 show, respectively, a fourth, fifth and sixth embodiment of the invention, corresponding, respectively, to the first, second and third embodiment described with reference to FIGS. 1-3, 4-5 and 6-7.

The packages according to these further embodiments differ from the packages of the corresponding embodiments previously illustrated in that the central area PM1 of the multilayer film PM, instead of being an area without coupling between the outer layer 17 and the inner layer 18, is an area of punctiform coupling, that is, an area in which the layers 17 and 18 are coupled to each other at points.

Such a configuration allows better coupling between the layers 17 and 18, at the same time allowing the inner layer 18 to be elastically deformed so as to adapt to any sharp parts present in the granular product which will fill the vacuum package, with a resulting absence of punctures thereof and without escape or deterioration of the granular product.

Naturally, the invention is not limited to the particular embodiments previously described and illustrated in the appended drawings, but it is possible to make thereto numerous modifications of detail within the reach of a person skilled in the art, without thereby departing from the scope of the invention as set forth in the appended claims.

The invention claimed is:

1. A package for granular products, comprising:
a parallelepiped container having a base or bottom wall, a top wall, a front wall, a rear wall and two side walls, the container being made of a multilayer material having at least one outer layer made of a stiff polymeric material and at least one inner layer made of an elastic polymeric material,
wherein said outer and inner layers are coupled along substantially all of the base or bottom wall and substantially all of the top wall at respective coupling zones, and
said package includes non-total coupling zones between said outer and inner layers at said front, rear and side walls, said outer and inner layers being coupled together in such a way to prevent air to enter therebetween, the non-total coupling zones at least extending lengthwise between the coupling zone at the base or bottom wall and the coupling zone at the top wall such that a central area of the container is configured to elastically deform by the inner layer in the non-total coupling zones and to remain stiff by the outer layer when a vacuum is created inside the package.

2. The package according to claim 1, wherein the non-total coupling zones between said outer and inner layers include said front, rear and side walls, substantially on the whole surface of the front, rear, and side walls.

3. The package according to claim 1, wherein a punctiform coupling between said outer and inner layers of material is provided at said front, rear and side walls.

4. The package according to claim 1, wherein a total coupling between said outer and inner layers is provided at said front, rear and side walls, close to the horizontal upper and lower corners of the package.

5. The package according to claim 1, wherein a pair of total coupling zones between said outer and inner layers of material is provided, said total coupling zones being placed at the vertical corners between said side walls and said rear wall.

6. The package according to claim 5, further comprising a second pair of total coupling zones between said outer and inner layers, said total coupling zones being placed at the vertical corners between said side walls and said front wall.

7. The package according to claim 1, wherein said stiff polymeric material is nylon.

8. The package according to claim 1, wherein said elastic polymeric material is one of polyethylene and polypropylene.

9. The package according to claim 1, wherein the non-coupling zones between the inner layer and the outer layer are substantially in a central, non-edge region of each of the front, rear and side walls.

10. The package according to claim 1, wherein the outer layer and the inner layer are coupled together at a perimeter of the multilayer material to form the coupling zones at the base or bottom wall and the top wall.

11. A package for granular products, comprising:
a parallelepiped container having a bottom wall, a top wall, a front wall, a rear wall, and two side walls, the container being made of a multilayer material having at least one outer layer made of a stiff polymeric material and at least one inner layer made of an elastic polymeric material, wherein the outer and inner layers are coupled to each other along selected surfaces of the container, including at least substantially all of the bottom wall and substantially all of the top wall at respective coupling zones, in such a way to prevent air to enter therebetween, and
non-total coupling zones at which the outer and inner layers are not totally coupled together are provided and extend at least lengthwise between the coupling zone at the bottom wall and the coupling zone at the top wall such that a central area of the container is configured to elastically deform by the inner layer in the non-total coupling zones and to remain stiff by the outer layer when a vacuum is created inside the package.

12. The package according to claim 11, wherein the outer and inner layers are not coupled along substantially all the surfaces of said front wall, rear wall, and side walls.

13. The package according to claim 11, wherein the outer and inner layers are punctiform coupled along substantially all the surfaces of said front wall, rear wall, and side walls.

14. The package according to claim 11, wherein the outer and inner layers are coupled close to horizontal upper and lower corners between the top wall and the front, rear, and side walls and the bottom wall and the front, rear, and side walls.

15. The package according to claim 11, wherein the outer and inner layers are coupled along vertical corners between said side walls and said rear wall.

16. The package according to claim 15, wherein the outer and inner layers are coupled along vertical corners between said side walls and said front wall.

17. The package according to claim 11, wherein said stiff polymeric material is nylon.

18. The package according to claim 11, wherein the inner layer and the outer layer are composed of different materials.

19. The package according to claim 11, wherein the non-coupling, zones between the inner layer and the outer layer are substantially in a central, non-edge region of each of the front, rear and side walls.

20. The package according to claim 11, wherein the outer layer and the inner layer are coupled together at a perimeter of the multilayer material to form the coupling zones at the bottom wall and the top wall.

* * * * *